US006972838B2

(12) United States Patent
McCauley

(10) Patent No.: US 6,972,838 B2
(45) Date of Patent: Dec. 6, 2005

(54) APPARATUS AND METHOD FOR ALIGNING DRIVESHAFTS USING A LASER

(75) Inventor: Stephen J. McCauley, Mackay (AU)

(73) Assignee: Beth McCauley, Mackay (AU), Partial Assignment ( * ) Notice: Subject to any disclaimer, the term of this patent is extended or adjusted under 35 U.S.C. 154(b) by 190 days.

(21) Appl. No.: 10/282,198

(22) Filed: Oct. 29, 2002

(65) Prior Publication Data

US 2003/0081212 A1 May 1, 2003

(30) Foreign Application Priority Data

Oct. 30, 2001 (AU) ................................ 200185527

(51) Int. Cl.[7] ................................................ G01C 1/00
(52) U.S. Cl. ...................... 356/153; 33/412; 356/152.3
(58) Field of Search ............................ 356/153, 152.3, 356/148, 399, 152.2; 33/412, 645, 286, 529

(56) References Cited

U.S. PATENT DOCUMENTS 4,709,485 A * 12/1987 Bowman ..................... 33/228
4,844,609 A 7/1989 Floyd et al.
5,026,998 A * 6/1991 Holzl .................... 250/559.37
5,359,781 A 11/1994 Melville
6,040,903 A * 3/2000 Lysen et al. ................ 356/153
6,662,457 B2 * 12/2003 Dameron ..................... 33/286

FOREIGN PATENT DOCUMENTS

| | | |
|---|---|---|
| DE | 28 56 158 A1 | 7/1980 |
| DE | 32 26 881 A1 | 1/1984 |
| EP | 1 083 402 A1 | 3/2001 |
| RU | 658041 | 4/1979 |
| SU | 2033596 | 4/1995 |

* cited by examiner

*Primary Examiner*—Layla G. Lauchman
(74) *Attorney, Agent, or Firm*—Hoffman, Wasson & Gitler, P.C.

(57) ABSTRACT

An apparatus to align a propeller shaft comprises two main, parts being a first part which is attached to a skeg and which contains a laser emitter, and a second part which is attached to the power outlet of the engine and which contains a prism to deflect the laser beam to a target board, the arrangement allowing alignment between the skeg and the power outlet such that when the propeller shaft is attached the propeller shaft is in perfect alignment.

25 Claims, 3 Drawing Sheets

APPARATUS AND METHOD FOR ALIGNING DRIVESHAFTS USING A LASER

FIELD OF THE INVENTION

This invention is directed to an apparatus and a method by which a driveshaft can be properly aligned using a laser beam. The invention finds particular application for use with aligning the propeller shaft of marine vehicles, but the invention need not be limited to this application, and can also be used to align driveshafts of heavy plant machinery and stationary engines.

BACKGROUND ART

The driveshaft of an engine usually extends between the engine gearbox and a driven member. In the case of a land vehicle, the driven member typically comprises the rear wheels of the vehicle (for a rear wheel drive). Specifically, the driveshaft extends between the engine gearbox (which is usually mounted at the front of the vehicle) and a differential (usually mounted at the rear of the vehicle) and which drives the rear wheels.

In the case of a water vessel, the driveshaft is a propeller shaft and extends from the gearbox of the engine to the propeller. The propeller shaft is supported for rotation by a bearing or bushing which is adjacent the propeller. The bush or bearing is typically mounted to the skeg of the vessel which is a projecting part that projects below the bottom of the hull.

It is important to ensure that the propeller shaft is correctly aligned to prevent unnecessary wear and tear on components such as bearings and bushings, to prevent unnecessary vibration, to maximise the handling ability and to maximise available power. A misaligned driveshaft and propeller shaft can create an unsafe machine due to excessive vibration, can result in inefficient fuel consumption, and can result in mechanical failure.

To date, the most common procedure to align a driveshaft with the gearbox power outlet and a bearing is by a visual system. However, this is not considered to be sufficiently accurate and there would be a great advantage in providing an apparatus and a method which would allow shaft alignment to be carried out extremely accurately but still in a relatively straightforward process.

OBJECT OF THE INVENTION

It is an object of the invention to provide an apparatus and a method which will enable shaft alignment to be carried out extremely accurately and in a relatively easy or convenient manner and which uses a laser to assist in the alignment action.

It is a further object of the invention to provide an apparatus and a method which may overcome at least some of the abovementioned disadvantages or provide the public with a useful or commercial choice.

In one form, the invention resides in an apparatus for aligning a shaft, the apparatus comprising: a first assembly which is attachable relative to an aperture through which the shaft will pass, the first assembly including a laser emitter, and an elongate member adapted to pass through the aperture and be held in the aperture, the elongate member being provided with a longitudinal straight bore through which the laser light can pass, a second assembly which is attachable relative to the power outlet of the engine and to which the driveshaft would be attached, the second assembly comprising an elongate member provided with a longitudinal straight bore along which the laser light can pass, but only when the elongate member of the first assembly and the elongate member of the second assembly are aligned such that the longitudinal straight bores in each said assembly are in linear alignment, the second assembly further having an inspection means to allow visual inspection of the laser passing through each said straight bore.

In this manner, a laser emitter is used to allow extremely accurate alignment of the shaft. Any misalignment can be corrected by the adjustment of the position of the power outlet of the engine or gearbox. One of the assembly can be attached to all relative to an aperture through which the driveshaft will pass (this aperture typically being spaced away from the gearbox), and the other of the assembly can be attached to the power outlet (typically from the gearbox). A laser beam can then be shone through rather narrow diameter bores passing through each assembly, and when the bores are aligned such that the laser beam will shine through each bore, the power outlet and the aperture are also aligned which means that when the driveshaft is attached, it will also be aligned.

The laser beam means that relatively short attachments can be used and it is not necessary to have some form of continuous member extending entirely from the gearbox to the distant aperture. Instead, the laser beam can be used.

The first assembly can be seen as a sending unit in the sense that it sends a laser beam to the second assembly. The first assembly may comprise an elongate member in the form of a first component which is adapted to fit through the aperture. The first component may comprise a substantially solid bar or rod which has a longitudinal bore formed there through, the bore being straight.

The length of the first component may vary depending on the size of the vessel and is typically between 10–400 cm. The first component is typically cylindrical in shape to allow it to pass through the aperture which is also typically cylindrical in shape. However, if the aperture has a different shape, the first component may also have a different outer shape. If desired, the first component can be adjustably fitted in the aperture.

The first component can be seen as a sending rod in the sense that it "sends" the laser beam to the second assembly. The first component is suitably fixed to the aperture such that it cannot move. This can be achieved by suitable fasteners which may include nuts and the like.

The longitudinal bore is preferably formed such that it passes through the "dead centre" of the aperture. In one form, the longitudinal bore is formed centrally through the first component.

The first assembly includes a laser emitter. The laser emitter may comprise any type of known laser emitting device which is typically battery powered. Such emitting devices are well known.

Typically, the laser emitter is held by a laser holder. The laser holder may allow the laser emitter to be securely held and adjustably held in the holder such that the position of the laser emitter may be adjusted. The laser holder typically includes attachment means to allow it to attach to the first component. The attachment means may comprise a flange on the laser holder and/or on one end of the first component.

The laser holder may include adjustment means to allow the position of the laser emitter in the laser holder to be adjusted. In one form, this can be achieved by adjustment screws.

Thus, once the laser holder has been attached to the first component, the laser can be adjusted to ensure that the laser beam passes through the longitudinal bore which is in the first component.

The diameter of the laser beam will usually be determined by the type of laser emitter and can be between 2–10 mm in diameter.

It is preferred that the longitudinal bore in the first component (the sending unit) is narrower that the diameter of the laser beam, and may have a bore diameter or size which is about 2 mm less that the diameter of the laser beam).

It is preferred that the longitudinal bore in the second assembly (the aligning unit) has a diameter or size which is larger than the laser beam, and may typically be about 2 mm larger than the diameter of the laser beam.

The apparatus includes a second assembly. The second assembly can be seen as the aligning assembly or aligning unit. The second assembly is typically positioned at the power outlet of the engine or gearbox.

The second assembly includes an elongate member in the form of a second component. The second component, like the first component in the first assembly, is formed with a longitudinal bore which is straight and through which the laser light can pass when the two bores are aligned. The second component may comprise an elongate rod. The elongate rod may have a length of between 10–40 cm although this can vary to suit. The diameter or cross-section of the elongate rod may also vary but is typically between 2–10 cm.

The second component has a longitudinal bore, and it is preferred that the bore does not extend entirely through the second component. Instead, it is preferred that the bore extends from one end face of the second component to a position spaced inwardly from the other end face of the second component. The reason for this will be described below.

However the longitudinal bore in the second component may extend entirely through the second component if required.

The second component may include attachment means to allow it to be attached to or relative to the power outlet. Suitably, the attachment means includes a flange on the second component.

If required, an intermediate attachment member or flange may be provided between the power outlet and the second component, the intermediate attachment or flange allowing the second component to be attached to various different types of power outlets. Alternatively, a number of different types of intermediate attachments may be provided each having one face which is the same thereby allowing the second component to be attached to the flange, and the other face being different depending on the type of power outlet.

The apparatus includes an inspection means to allow visual inspection of the laser passing through each said straight bore. The inspection means may comprise a deflecting surface. The deflecting surface may include a prism. The deflecting surface may be positioned inside the bore of the second component to deflect the laser light through an opening in the side wall of the second component. A visual inspection can then be made to see if the laser light is passing through the straight bore in the second component substantially along the central part of the bore, in which case a proper alignment is realised.

If desired, some form of target board can be provided to enable the visual inspection to be made. The target board may include a relatively small flat member which is typically held next to the opening to enable the alignment of the laser light to be seen without needing to look directly at the laser light (which may be harmful).

BRIEF DESCRIPTION OF THE DRAWINGS

An embodiment of the invention will be described with reference to the following drawings in which FIG. 1. Is an overall illustration showing positioning of the various parts of the apparatus in a marine vessel.

BEST MODE

Figure 1:
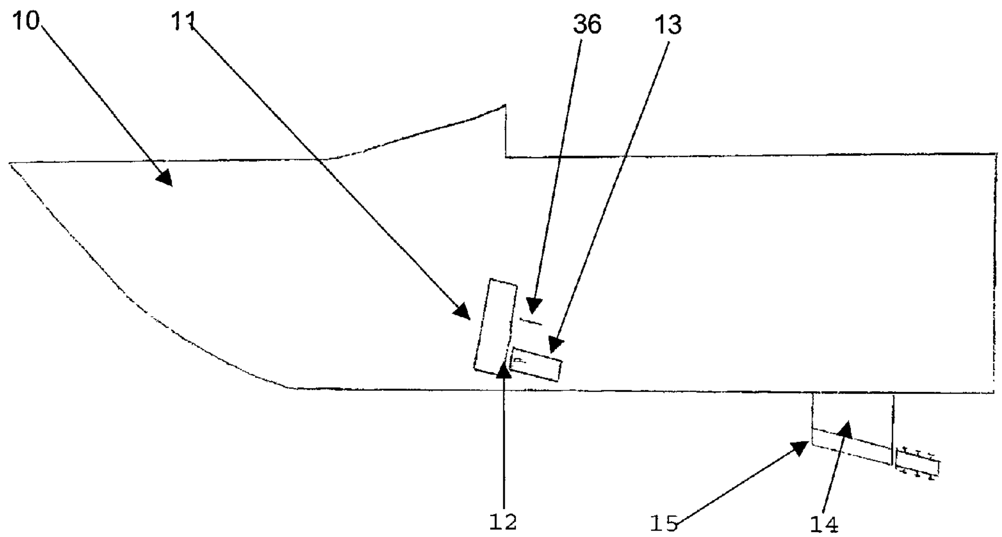

Referring initially to FIG. 1, there is illustrated generally the position of the parts of the apparatus according to an embodiment of the invention. Briefly, FIG. 1 illustrates a boat 10. The boat will have an engine (not illustrated) which is coupled to a gearbox 11. Gearbox 11 is provided with a power outlet 12. Attached relative to power outlet is the second assembly 13 which forms part of the apparatus, and which is best illustrated in FIG. 3. Adjacent the rear part of the boat and underneath the boat is a skeg 14 which is provided with a longitudinal passageway or aperture 15. Attached inside aperture 15 is the first component of the first assembly of the apparatus (this being best illustrated in FIG. 2).

Figure 2:
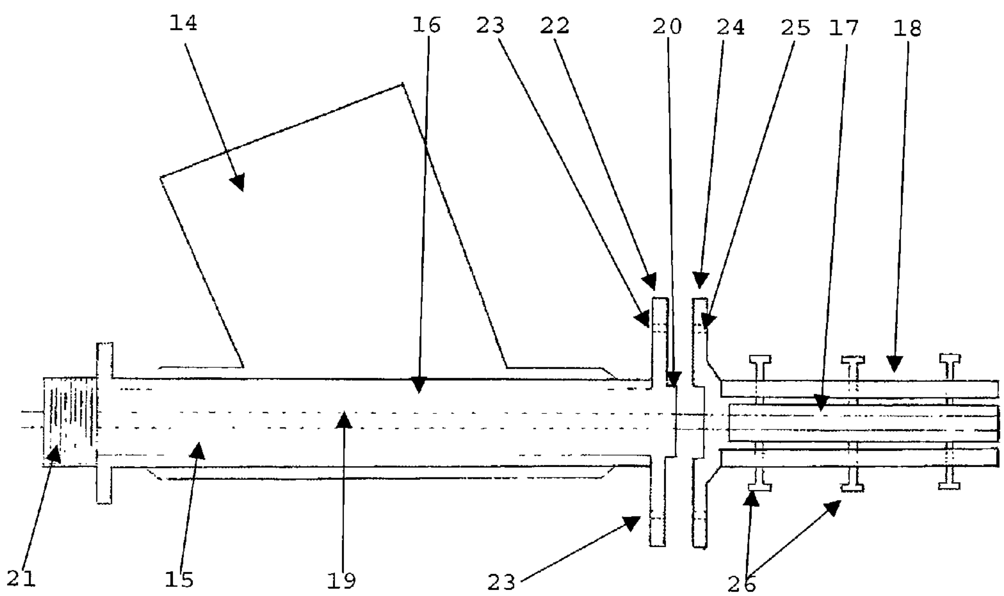
FIG. 2. Illustrates the components of the first assembly.
Figure 3:
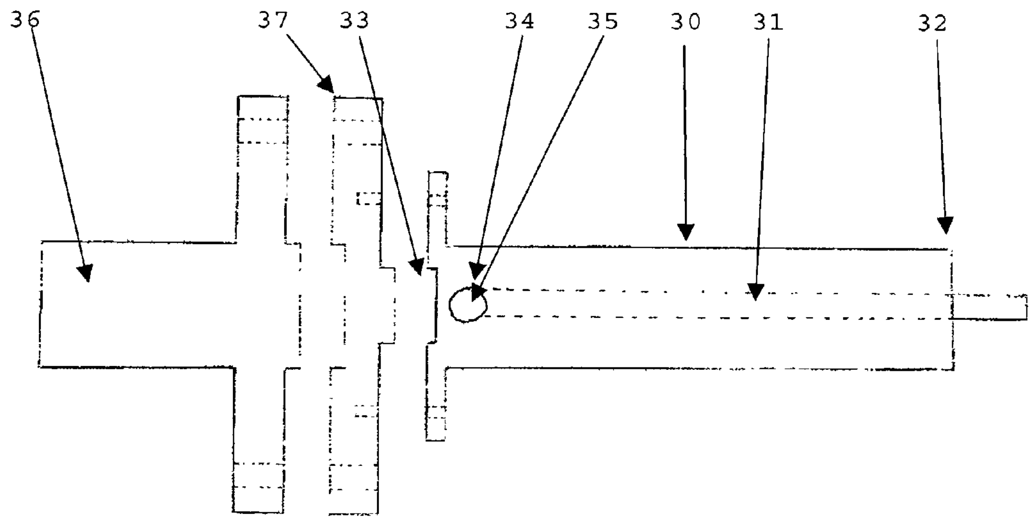
FIG. 3. Illustrates the components of the second assembly.

Referring to FIG. 2, there is shown a close-up of skeg 14 and the various parts which make up the first assembly. Specifically, skeg 14 has a longitudinal cylindrical passageway or aperture 15. The aperture has a length of between 5–20 cm and a diameter of between 2 to 5 cm. The aperture 15 ultimately provides support for the propeller shaft.

The first assembly comprises three main parts which is a first component 16 which is fitted within aperture 15, a laser emitter 17 which can be of known design, and a laser holder 18. First component 16 comprises an elongate cylindrical rod which has an outer wall which fits snugly within aperture 15. First component 16 is clamped or otherwise fastened in place such that it does not move. First component 16 is longer than the length of aperture 15 such that the first component extends entirely through aperture 15. First component 16 is formed with a longitudinal straight bore 19 which is cylindrical and which has a diameter of between 2–5 mm (although this can vary depending on the diameter of the laser light beam). The bore 19 extends entirely through first component 16 from one end face 20 of component 16 to the other end face 21 of component 16. Thus, bore 19 is a through bore.

The diameter of bore 19 is approximately 2 mm less than the diameter of the laser beam.

The one end face 20 of component 16 is formed with an attachment flange 22 which can be cylindrical and which is formed with a number of openings 23 through which fasteners (eg bolts) can pass.

Laser holder 18 comprises an elongate substantially hollow body. One end of laser holder 18 is also formed with a flange 24 containing openings 25 and this allows laser holder 18 to be attached to first component 16.

Laser holder 18 supports a laser 17. The laser 17 may be of conventional manufacture and is typically powered by a battery. The laser 17 is positioned in laser holder 18 such that the laser light passes through the bore 19. To ensure that the laser light passes through the bore 19, the laser 17 may be adjustably mounted to laser holder 18 through a plurality of adjustment screws 26.

Thus, initially first component 16 is attached to skeg 14 and held in place. A laser 17 is positioned inside laser holder 18, and laser holder 18 is clamped to one end of first component 16 through the respective flanges 22, 24. Laser 17 can then be adjusted via screws 26 such that the laser been passes along bore 19.

Referring to FIG. 3, there is illustrated the second assembly 12 which is positioned adjacent the gearbox 11. Second assembly 12 basically consists of a second component 30. Second component 30 comprises an elongate rod which is preferably substantially cylindrical and may have a length of between 10–400 cm and a diameter of between 2–50 cm Second component 30 is formed with a longitudinal straight bore 31 which has a diameter which is larger than the diameter of bore 19 in first component 16. Thus, the diameter of the bore may be between 2–5 mm. The bore has a diameter which is approximately 2 mm larger than the diameter of the laser beam.

The bore 31 does not extend entirely through and along second component 30. Instead, the bore extends from one end face 32 towards but spaced away from the other end face 33. At the end 34 of bore 31 is an opening 35 which extends through the side wall of second component 30.

At the end 34 of the bore 31 is a light deflecting member which in the embodiment comprises a prism (not illustrated) which deflects the laser light out through opening 35.

A target board 36 (see FIG. 1) can then be used to see the positioning of the laser beam through bore 31. Target board 36 typically comprises as small flat board with a dark matte finish to enable the laser beam to be readily viewed.

Second component 30 is attached to the power outlet or driveshaft 36 of the gearbox 11. An intermediate flange 37 may be required to allow second component 30 to be coupled to the power outlet of the gearbox.

In use, the first assembly is positioned relative to skeg 14, and the second assembly is positioned relative to gearbox 11. The laser is then turned on and the laser light passes through bore 19 and towards second component 30. Second component 30 can be adjusted in position by adjustment of gearbox 11 until the laser light passes through bore 31. The laser light will be deflected by the prism and can be viewed on target board 36.

Once the laser beam is visualised on the target board, the power outlet is moved by small increments until a full circle of laser beam is observed. At this stage, at this stage the alignment is correct. Should the alignment be incorrect, there will be an incomplete circle of the laser light.

At this stage, the power outlet is aligned with aperture 15 in skeg 14. The gearbox can then be locked in place, the first and second assembly is can be removed and the drive shaft or propeller shaft can then be attached knowing that the shaft is now properly aligned.

The various parts of the apparatus can be made from corrosion resistant materials such as stainless steel.

Figure 4:
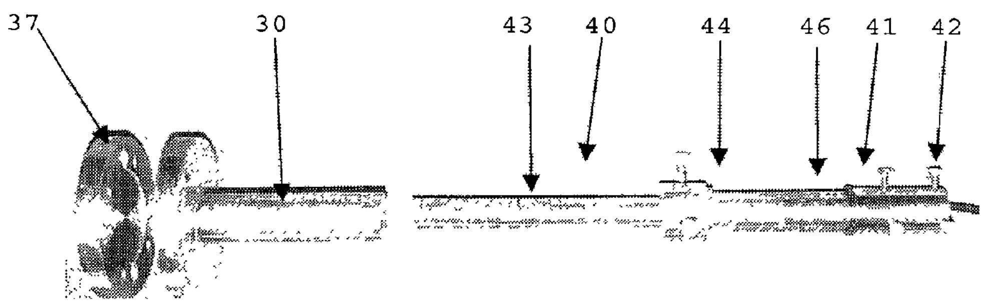
FIG. 4. Illustrates a modification of the apparatus
Figure 5:
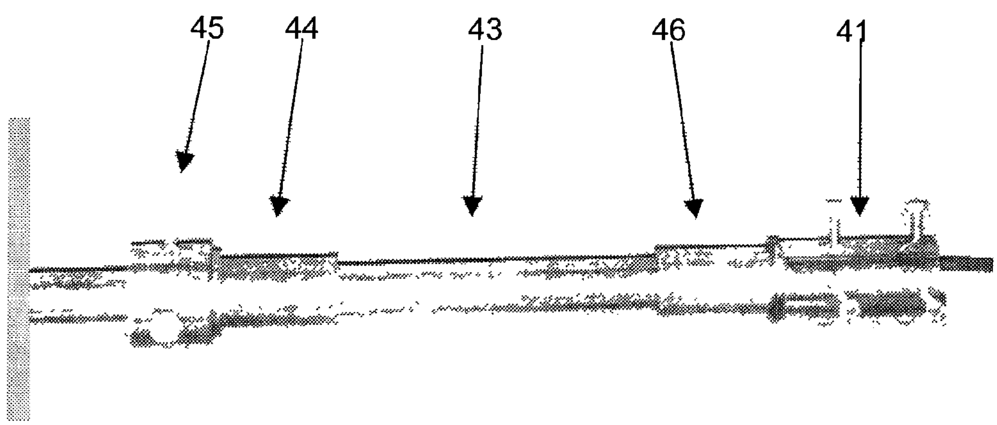
FIG. 5. Illustrates a modification of the first assembly.

Referring to FIGS. 4 and 5 there is illustrated a slight variation of the apparatus. The apparatus is substantially the same and comprises a first assembly 40 which contains a laser emitter 41 at one end which is adjustable through adjustment bolts 42. The first assembly basically comprises an elongate rod 43 which has a longitudinal bore to allow the laser light to pass through the rod. The variation is that rod 43 is provided with a sleeve 44 which can slide along rod 43. Sleeve 44 can be locked in place through locking bolts 45. The advantage of sleeve 44 is that it allows the first assembly to be used in respect of different sized skegs. For instance, if the skeg bore is a larger size, sleeve 44 can be removed from rod 43 and a larger sleeve (not illustrated) can be slid along rod 43. This means that the rod 43 and the attached laser 41 does not need to be tampered with or replaced and the variation in bore sizes in the skegs can be accommodated by providing a number of different sized sleeves 44. In FIG. 4, sleeves 44 is shown pushed up against the collar 46 on one end of rod 43 and in FIG. 5, sleeve 44 is adjacent the other end of rod 43.

What is claimed is:

1. An apparatus to align a driveshaft pathway prior to attachment of a driveshaft, the pathway extending from a power outlet of an engine and through an aperture that is positioned away from the power outlet comprising:

a first assembly which is attachable relative to the aperture through which the driveshaft will pass, the first assembly comprising an elongate member adapted to pass through the aperture and be held in the aperture, the elongate member being provided with a longitudinal straight bore, and a laser emitter which is adapted to emit a laser beam through the longitudinal straight bore and towards the power outlet, a second assembly which is attachable relative to the power outlet of the engine, the second assembly comprising an elongate member provided with a longitudinal straight bore along which the laser beam from the first assembly can pass, but only when the elongate member of the first assembly and the elongate member of the second assembly are in linear alignment, the second assembly further having an inspection means to allow visual inspection of the laser beam passing through each said straight bore.

2. The apparatus of claim 1 wherein the driveshaft passageway is for a marine propeller driveshaft, the engine comprising a marine engine, and the aperture is in a skeg.

3. The apparatus as claimed in claim 1, wherein the first assembly elongate member comprises a first component which is adapted to fit through the aperture.

4. The apparatus as claimed in claim 3, wherein the first component comprises a substantially solid bar or rod which has the longitudinal straight bore formed therethrough.

5. The apparatus as claimed in claim 4 wherein the length of the first component is between 10–400 cm.

6. The apparatus as claimed in claim 5, wherein the first component is cylindrical in shape to allow it to pass through the aperture which is cylindrical in cross section.

7. The apparatus as claimed in claim 6, wherein the longitudinal bore in the first component has a central longitudinal axis, and the aperture comprises a longitudinal passageway which has a central longitudinal axis, the axis of the longitudinal bore being aligned with the longitudinal passageway of the aperture.

8. The apparatus as claimed in claim 1, comprising a laser holder to hold the laser emitter.

9. The apparatus as claimed in claim 8, wherein the laser holder includes adjustment means to allow the position of the laser emitter to be adjusted relative to the laser holder.

10. The apparatus as claimed in claim 9, wherein the adjustment means comprises at least one adjustment screw.

11. The apparatus as claimed in claim 8, wherein the laser holder comprises an attachment means to allow it to be attached to one end of the first assembly elongate member.

12. The apparatus as claimed in claim 11, wherein the attachment means comprises a flange.

13. The apparatus as claimed in claim 1, wherein the laser beam is circular in cross-section and has a diameter, the longitudinal bore in the second assembly has a diameter which is greater than the diameter of the laser beam and the longitudinal bore in the first assembly has a diameter which is less than the diameter of the laser beam.

14. The apparatus as claimed in claim 1, wherein the second assembly elongate member comprises a second component.

15. The apparatus of claim 14, wherein the second component comprises an elongate rod.

16. The apparatus of claim 15, wherein the elongate rod has a length of between 10–40 cm and a diameter of between 2–10 cm.

17. The apparatus as claimed in claim 14 wherein second component has a first end face and an opposite second end face, the longitudinal bore extending from the first end face to a position spaced inwardly from the second end face.

18. The apparatus as claimed in claim 17 comprising attachment means to allow the second component to be attached to or relative to the power outlet.

19. The apparatus of claim 18, wherein the attachment means comprises a flange on the second component.

20. The apparatus as claimed in claim 19 comprising an intermediate attachment flange between the power outlet and the second component, the intermediate flange allowing the second component to be attached to various different types of power outlets.

21. The apparatus as claimed in claim 1, wherein the inspection means comprises a deflecting surface.

22. The apparatus as claimed in claim 21 wherein the deflecting surface is a prism.

23. The apparatus as claimed in claim 22 wherein the deflecting surface is positioned inside the bore of the second assembly elongate member to deflect the laser beam through an opening in the side wall of the second assembly elongate member.

24. The apparatus as claimed in claim 23 comprising a target board to enable the visual inspection to be made.

25. The apparatus as claimed in claim 24, wherein the target board is a relatively small flat member which is typically held next to the opening to enable the alignment of the laser beam to be seen without needing to look directly at the laser beam.

* * * * *